Dec. 11, 1934.   J. L. SUTTON ET AL   1,984,347

FAUCET CONNECTION

Filed Nov. 3, 1933

Inventors
J. Leroy Sutton &
Joseph Van Walshauser.

By Bean & Brooks
Attorneys

Patented Dec. 11, 1934

1,984,347

UNITED STATES PATENT OFFICE 1,984,347

FAUCET CONNECTION

J. Leroy Sutton, Buffalo, and Joseph Van Walshauser, Kenmore, N. Y., assignors to Sev, Inc., Buffalo, N. Y., a corporation of New York Application November 3, 1933, Serial No. 696,570

2 Claims. (Cl. 285—81)

This invention relates to a coupling and primarily to a readily attachable and detachable coupling for connecting a hose to a faucet or other pipe.

Connectors of this general type have heretofore been designed but their constructions have been largely impractical and would not maintain the desired connection when the water or fluid was passing through at a comparatively high pressure.

The present invention has for its object to provide a detachable coupling which is more efficient and durable and one which may be very readily applied to a faucet to effect a hose connection therewith. Further, the invention has for its object to provide a coupling having means to effect a more tenacious grip on the faucet and thereby maintain its connection in a very practical manner.

Figure 1:
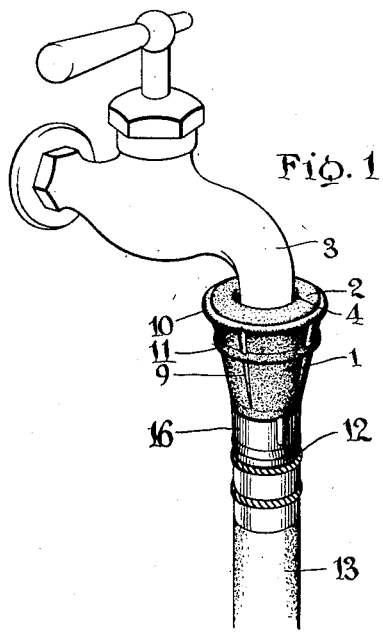
Fig. 1 is a perspective view of a coupling embodying the present invention and illustrating one of its practical applications.

Referring more particularly to the drawing, the numeral 1 designates the shell or body of the coupling which is preferably formed of rubber somewhat stiffened to give sufficient strength to the body without destroying its elasticity. This elastic shell is provided with a mouth portion having an end wall 2 of a thickness sufficient to render the mouth self-sustaining so that it will substantially maintain its shape when slipping the coupling over the faucet or other pipe 3, the term faucet being used inclusively herein. This end wall is preferably of greater thickness than the side wall of the shell since the latter may more readily be reinforced, as will hereinafter be set forth.

The mouth is provided with an entrance opening 4 which leads through an inwardly extending faucet gripping sleeve 5 into the shell interior. This sleeve, which tapers inwardly, depends from the substantial end wall 2 and is unattached at its inner end portion so as to be free to flex within the annular channel 6 surrounding the same and thereby accommodate different faucets and accord greater flexibility in the attachment thereto. The wall thickness of the tapering sleeve 5 is substantially uniform throughout its inward taper and is materially less in thickness than its supporting end wall 2 so as to expand and adjust itself to receive faucets of different diameters.

Means are provided to insure a firm grip or securement of the coupling on a faucet during its application thereto. According to the present disclosure this means comprises one or more faucet embracing ribs or shoulders 7 provided on the unattached depending portion of the tapered sleeve.

These annular ribs are provided on the tapered interior wall of the sleeve and are of different diameters, the inner rib being of smaller diameter than the outer rib so as to provide a more snug fit about the discharge end of the faucet or pipe 3 while the outer rib affords a secondary hold on the faucet and serves to reinforce the grip of the inner rib against the pressure of the water, or other fluid, tending to blow the coupling off the faucet. The tenacity of the grip of the lower contracted end of the sleeve 5 is such as to prevent the coupling from accidentally slipping off the faucet, holding securely under certain pressures which tend to force the shell axially from over the sleeve even to the extent of pulling the outer flaring end of the sleeve downwardly over the tapered or contracted end before the grip is finally broken. The securement is added to by the internal fluid pressure within the channel 6.

Figure 4:
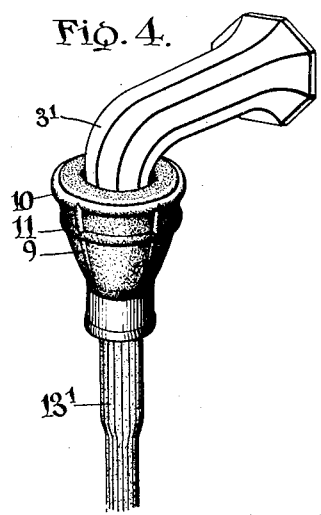
Fig. 4 is a view similar to Fig. 1 but illustrating the coupling connected to an ornamental faucet and adapted for rubber tubing use.
Figure 2:
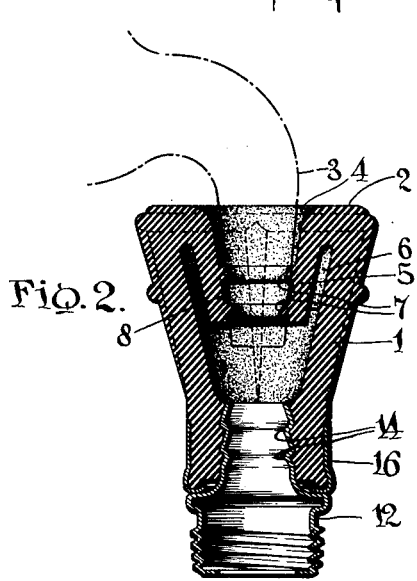
Fig. 2 is a vertical sectional view through the coupling and depicting in broken lines the manner in which it is applied to a standard faucet.
Figure 5:
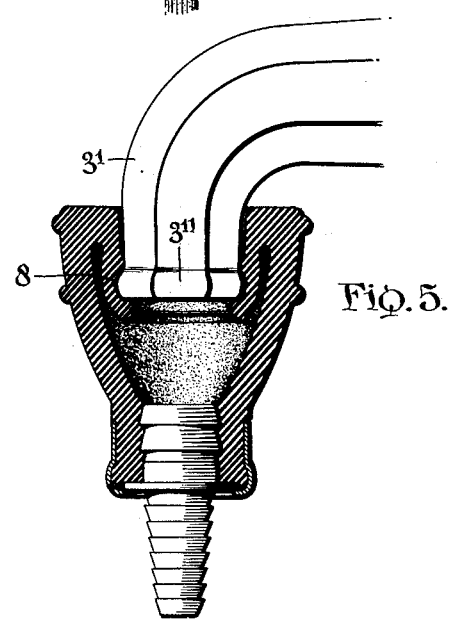
Fig. 5 is a sectional view through the coupling illustrated in Fig. 4 with the rubber tubing adapter left in elevation.
Figure 3:
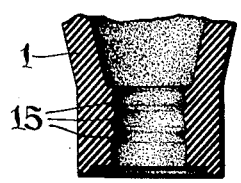
Fig. 3 is a detail sectional view of the lower end of the coupling shell.

The gradual outward flare of the sleeve from its inner end provides a mouth for the coupling of a sufficient size to accommodate various designs and shapes of faucets. For example, in Figs. 4 and 5, the larger ornamental faucet 3' is provided with a discharge end which is furnished with a bead 3". Where desired the bead 3" may be securely engaged in the channel or seat 8 intermediate the axially spaced ribs 7, although for standard faucets the sleeve is passed entirely over the discharge end of the faucet to enable a most secure mounting for the coupling, as is depicted by the broken lines in Fig. 2.

By reason of the self-sustaining character of the wall 2 and the relatively greater flexibility of the depending sleeve, the general external appearance and shape of the coupling is preserved because of the fact that the freely depending sleeve will yield to accommodate the faucet without collapsing or rolling in the faucet end of the shell.

To give longitudinal support to the shell as it is slipped over the faucet a plurality of longitudinal ribs 9 are provided on the shell. These ribs increase in size toward the end wall 2 and merge into an annular pressure distributing bead 10 which encircles the periphery of the wall 2. This reinforcement to the resilient shell provides sufficient strength to avoid a collapsing or rolling in of the body and the wall 2 during the passing of the sleeve over the faucet.

Means are provided for locating the application of the hand pressure to the shell when slipping the coupling over a faucet. This means, according to the present showing, is in the form of an annular shoulder 11 which encircles the shell in a plane substantially midway between the attached and free ends of the faucet gripping sleeve 5. This shoulder locates the application of the hand pressure at a point on the resilient shell which is well outside the outermost flaring portions of the faucet gripping sleeve and is sufficiently spaced from the wall 2 to avoid the collapsing thereof due to radial forces which occur incidental to the longitudinal pressure applied by the hand in effecting the coupling. By applying the hand pressure to this shoulder 11 the sleeve is supported radially against inward flexure into contact with the free inner end of the sleeve 5 and thereby allows the latter to freely expand and distend during the application of the coupling to the faucet. Furthermore, the stress carrying ribs 9 serve to transmit and distribute the pressure to the bead 10 as well as the wall 2 without applying radial pressure thereto at any localized point.

The discharge end of the shell is provided with a union or adapter member 12 which may be threaded to facilitate its connection to a hose 13, such as may be required for use in the laundry, or the adapter union may be equipped with shoulders to telescopingly receive rubber tubing in common use on bath sprays and the like, this latter type of union being depicted in Fig. 6 at 13'. The union is preferably provided with ribs 14 about which the discharge end of the shell 1 is contracted to effect the desired securement. As a further aid toward effecting a firm securement, the discharge end of the shell may be provided with internal ribs 15 for interlocking with the ribs 14, and further with an embracing band 16.

What is claimed is:

1. A detachable coupling for connecting a hose to a faucet, and the like, comprising a unitary elastic body having an outer shell adapted at one end for connection to a hose, the opposite end of the shell having an inwardly extending and self-sustaining end wall of greater thickness, said end wall having a faucet receiving opening therethrough, a faucet gripping sleeve extending inwardly from and integrally carried by the end wall, and a faucet gripping rib on the inner wall of the sleeve and at a point spaced inwardly from said end wall whereby the rib may expand with the inner end of the sleeve over a faucet independently of the shell of the elastic body and independently of said end wall, said sleeve being spaced from said shell whereby the back pressure of the liquid passing through the coupling body will serve to press the rib against the inserted faucet.

2. A detachable coupling for hose connections to faucets, comprising a unitary resilient body having a conical shell with a self-sustaining end wall at its larger end, a faucet gripping sleeve suspended from the end wall into the shell and in unsupported contact therewith, and a pressure locating shoulder integral with and encircling the shell in a plane intermediate the attached and the unattached ends of said sleeve and underlying the self-sustaining end wall, whereby the pressure is applied on the shell, in attaching the coupling to a faucet, along longitudinal lines within the outer periphery of the body, in the plane of said self-sustaining end wall, to thereby resist an inward rolling action of the end wall on the faucet, said pressure locating shoulder being disposed in a plane above the lower free end of the sleeve whereby any collapse of the shell against the sleeve incidental to the manual pressure on the shoulder will act directly on the sleeve above its lower end to urge the latter onto the faucet.

J. LEROY SUTTON.
JOSEPH VAN WALSHAUSER.